(12) United States Patent
Hsu et al.

(10) Patent No.: US 7,370,876 B2
(45) Date of Patent: May 13, 2008

(54) WHEELCHAIR SUSPENSION

(75) Inventors: Cheng-Ho Hsu, Sanmin District (TW); Ruei-Hong Huang, San Pu Tsun (TW); Yuch-Ying Lee, Yung An Li (TW); Tsung-His Shih, Tso Ying District (TW)

(73) Assignee: Kwang Yang Motor Co., Ltd. (TW)

( * ) Notice: Subject to any disclaimer, the term of this patent is extended or adjusted under 35 U.S.C. 154(b) by 263 days.

(21) Appl. No.: 11/233,281

(22) Filed: Sep. 23, 2005

(65) Prior Publication Data

US 2006/0201723 A1 Sep. 14, 2006

(51) Int. Cl.
*A61G 5/10* (2006.01)
(52) U.S. Cl. ..................... 280/650; 180/65.1
(58) Field of Classification Search ............ 180/24.02, 180/21, 22, 24.03, 65.1, 907; 280/124.1, 280/650, 647, 304.1, 755
See application file for complete search history.

(56) References Cited

U.S. PATENT DOCUMENTS

| | | | | |
|---|---|---|---|---|
| 4,310,167 A * | 1/1982 | McLaurin | ............ | 280/5.28 |
| 5,855,387 A * | 1/1999 | Gill et al. | ............ | 280/283 |
| 6,454,286 B1 * | 9/2002 | Hosino | ............ | 280/250.1 |
| 6,923,278 B2 * | 8/2005 | Mulhern et al. | ............ | 180/65.1 |
| 7,055,835 B2 * | 6/2006 | Wu | ............ | 280/86.1 |
| 2004/0060748 A1 * | 4/2004 | Molnar | ............ | 180/65.1 |
| 2004/0168839 A1 * | 9/2004 | Wu | ............ | 180/65.1 |
| 2005/0034903 A1 * | 2/2005 | Wu | ............ | 180/65.1 |
| 2005/0206149 A1 * | 9/2005 | Mulhern et al. | ............ | 280/755 |
| 2006/0201723 A1 * | 9/2006 | Hsu et al. | ............ | 180/24.02 |
| 2006/0213705 A1 * | 9/2006 | Molnar | ............ | 180/65.2 |
| 2007/0023209 A1 * | 2/2007 | Wu | ............ | 180/65.1 |
| 2007/0209845 A1 * | 9/2007 | Chen et al. | ............ | 180/15 |

* cited by examiner

*Primary Examiner*—Saul Rodriguez
*Assistant Examiner*—Karen J. Amores
(74) *Attorney, Agent, or Firm*—Banner & Witcoff, Ltd

(57) ABSTRACT

A side frame assembly for a wheelchair suspension includes a mainframe, and a front caster frame connected pivotally to both a front end of the mainframe and a front caster. A return spring is disposed between the front caster frame and the mainframe so as to bias the front caster to a predetermined position. A drive wheel assembly includes a drive wheel frame, a drive wheel disposed pivotally on the drive wheel frame, and a driving unit operable to rotate the drive wheel. A linkage is connected pivotally to the mainframe, the front caster frame and the drive wheel frame. A rear caster assembly includes a rear caster frame attached to a rear end of the mainframe, and a rear caster disposed pivotally on the rear caster frame.

4 Claims, 5 Drawing Sheets

WHEELCHAIR SUSPENSION

BACKGROUND OF THE INVENTION

1. Field of the Invention

This invention relates to a wheelchair, and more particularly to a wheelchair suspension.

2. Description of the Related Art

Referring to FIGS. 1 and 2, a conventional suspension disclosed in U.S. Patent Application Publication No. 2004/0060748 A1 is incorporated in a wheelchair 100, and has two side frame assemblies 1, each of which includes a front caster assembly 11, a rear caster assembly 12, a linkage 13, a drive wheel 14, a driving unit 15 and a return spring unit 16.

The front caster assembly 11 includes a front mainframe 112, a front caster frame 113 extending downwardly from a front end of the front mainframe 112, a drive wheel frame 114 extending downwardly from a rear end of the front mainframe 112, and a front caster 115 disposed pivotally on a lower end of the front caster frame 113.

The rear caster assembly 12 includes a rear mainframe 122, a front connecting frame 123 extending downwardly from a front end of the rear mainframe 122, a rear caster frame 124 extending downwardly from a rear end of the rear mainframe 122, and a rear caster 125 disposed pivotally on a lower end of the rear caster frame 124. The rear mainframe 122 cooperates with the front mainframe 112 to support a seat 300.

The linkage 13 has two ends connected respectively and pivotally to the front caster frame 113 and the front connecting frame 123.

The drive wheel 14 has a diameter greater than those of the front and rear casters 115, 125, and is disposed pivotally on the corresponding drive wheel frame 114.

The driving unit 15 includes an electric motor 151 installed on the corresponding drive wheel frame 114 and operable to rotate the corresponding drive wheel 14.

The return spring unit 16 includes a front spring 162 interconnecting the corresponding front mainframe 112 and the corresponding front connecting frame 123, and a rear spring 162' interconnecting the corresponding drive wheel frame 114 and the corresponding rear mainframe 122.

Referring to FIGS. 2 and 3, because of the presence of the front and rear springs 162, 162', the drive wheel 14 and the front and rear casters 115, 125 can be brought into contact with a horizontal surface simultaneously.

Referring to FIG. 4, when the front caster 115 climbs over an obstacle 200 in the wheelchair's path, such as a stair, the front and rear springs 162, 162' are stretched so as to allow the front caster 115 to rise relative to the drive wheel 14 and the rear caster 125. After the rear caster 125 surmounts the obstacle 200, the front and rear springs 162, 162' return to their original shapes so as to allow the front caster 115 to contact a top surface of the obstacle 200.

To test the wheelchair 100, the following parameters were used: a radius of each of the front and rear casters 115, 125 of 75 mm, a distance between the axles of the front casters 115 and the rear casters 125 of 668 mm, a radius of each of the drive wheels 14 of 130 mm, a person sitting on the wheelchair 100 weighing 70 kilograms, and a total weight of the remaining portion of the wheelchair 100 supported by the front and rear casters 115, 125 and the drive wheels 14 of 74 kilograms. When the front casters 115 surmount different obstacles 200, corresponding inclination angle changes of the seat 300 of the wheelchair 100 are as outlined in the following chart:

| | Obstacle Height (mm) | | | | | |
| --- | --- | --- | --- | --- | --- | --- |
| | 10 | 20 | 30 | 40 | 50 | 60 |
| Angle Change (degrees) | 1.26 | 2.54 | 3.83 | 5.13 | 6.44 | 7.77 |

In the case where the height of the obstacle 200 is 50 mm, when the front casters 115 contact the obstacle 200, the load ratios of the front casters 115, the rear casters 125 and the drive wheels 14 are respectively 18.9%, 11.6% and 69.5%; after the front casters 115 surmount the obstacle 200 and before the drive wheels 14 contact the obstacle 200, the load ratios of the front casters 115, the rear casters 125 and the drive wheels 14 are respectively 16.9%, 26.8% and 56.3%; after the front casters 115 surmount the obstacle 200 and when the drive wheels 14 contact the obstacle 200, the load ratios of the front casters 115, the rear casters 125 and the drive wheels 14 are respectively 21.4%, 34.2% and 44.4%; after the drive wheels 14 surmount the obstacle 200 and before the rear casters 125 contact the obstacle 200, the load ratios of the front casters 115, the rear casters 125 and the drive wheels 14 are respectively 9.9%, 24.6% and 65.5%; after the drive wheels 14 surmount the obstacle 200 and when the rear casters 125 contact the obstacle 200, the load ratios of the front casters 115, the rear casters 125 and the drive wheels 14 are respectively 0.3%, 23.5% and 76.2%; and after the rear casters 125 surmount the obstacle 200, the load ratios of the front casters 115, the rear casters 125 and the drive wheels 14 are respectively 15.4%, 21.9% and 62.7%.

As indicated by the test data in the chart that, even when the height of the obstacle 200 is 60 mm, the inclination angle change of the seat is only 7.77°. This poses no safety risk and provides no feeling of discomfort to the person sitting on the wheelchair 100.

In the case where the obstacle 200 is 50 mm high, however, after the drive wheels 14 surmount the obstacle 200, and when the rear casters 125 contact the obstacle 200, the load ratio of the front casters 115 is only 0.3%. Since load ratio is proportional to the anti-tip and supporting ability of a wheel or caster, the wheelchair 100 tends to tip or become unstable after the drive wheels 14 surmount the obstacle 200, and when the rear casters 125 contact the obstacle 200.

SUMMARY OF THE INVENTION

The object of this invention is to provide a wheelchair suspension that includes a front caster, which is connected to other elements in a specific manner so as to have a large load ratio, thereby promoting the anti-tip and supporting ability of the front caster.

According to this invention, a side frame assembly for a wheelchair suspension includes a mainframe, and a front caster frame connected pivotally to both a front end of the mainframe and a front caster. A return spring is disposed between the front caster frame and the mainframe so as to bias the front caster to a predetermined position. A drive wheel assembly includes a drive wheel frame, a drive wheel disposed pivotally on the drive wheel frame, and a driving unit operable to rotate the drive wheel. A linkage is connected pivotally to the mainframe, the front caster frame and the drive wheel frame. A rear caster assembly includes a rear caster frame attached to a rear end of the mainframe, and a rear caster disposed pivotally on the rear caster frame.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

A wheelchair suspension of this invention is incorporated in an electric wheelchair, and includes two side frame assemblies. Because the two side frame assemblies are similar in construction to each other, the structure and operation of only one side frame assembly will be described.

Figure 5:
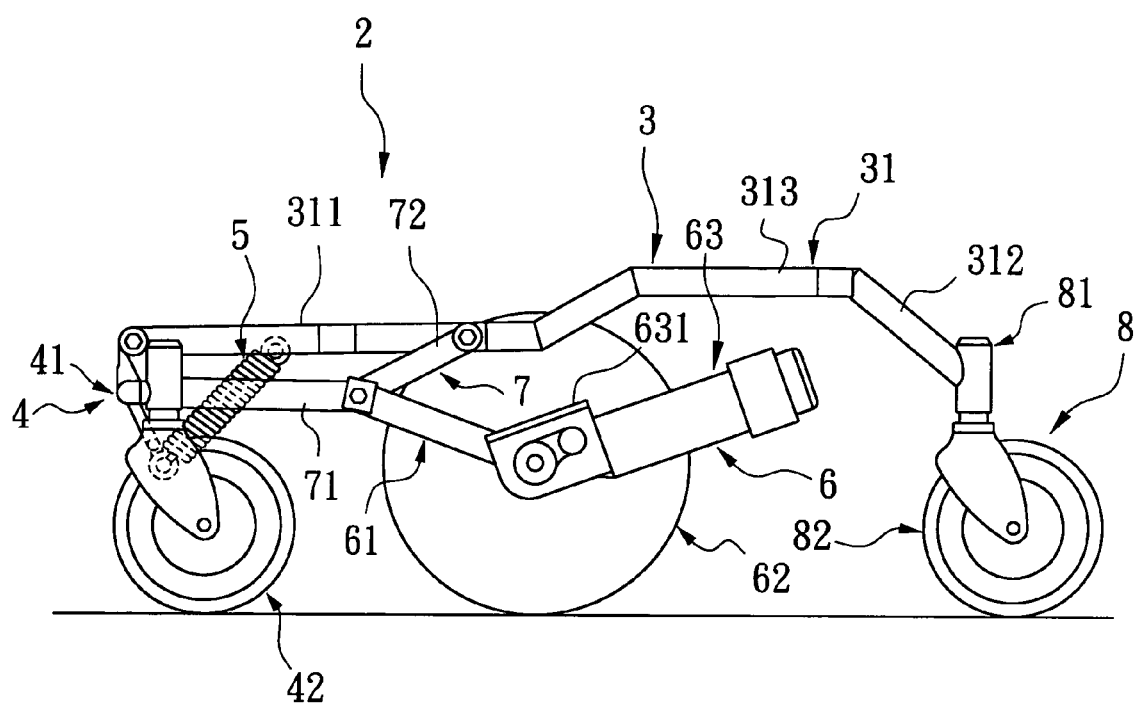
FIG. 5 is a side view of a side frame assembly of the preferred embodiment of a wheelchair suspension according to this invention.

Referring to FIG. 5, a side frame assembly 2 of the preferred embodiment of a wheelchair suspension according to this invention includes a mainframe 3, a front caster assembly 4, an inclined return spring 5, a drive wheel assembly 6, a linkage 7 and a rear caster 8.

The mainframe 3 has a front connecting section 311, a rear connecting section 312, and a middle section 313 interconnecting the front and rear connecting sections 311, 312 and supporting a seat (not shown) thereon.

Figure 6:
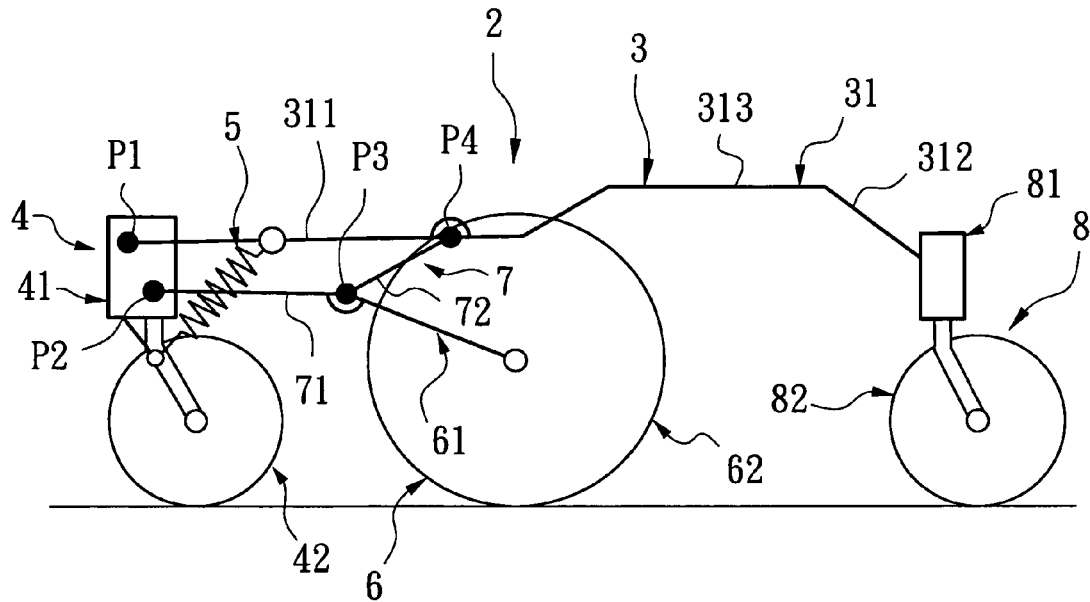
FIG. 6 is a schematic side view of the preferred embodiment when it moves on a horizontal surface.

With additional reference to FIG. 6, the front caster assembly 4 includes a front caster frame 41 and a front caster 42. The front caster frame 41 has an upper end connected pivotally to a front end of the front connecting section 311 of the mainframe 3 at a first pivot point (P1), and a lower end connected pivotally to the front caster 42.

The return spring 5 is configured as a coiled compression spring that has a rear upper end fastened to the front connecting section 311 of the mainframe 31, and a front lower end fastened to the front caster frame 41. As such, the return spring 5 biases the front caster 42 to a predetermined position relative to the mainframe 3.

The drive wheel assembly 6 is disposed behind the front caster assembly 4, and includes a drive wheel frame 61, a drive wheel 62 disposed pivotally on the drive wheel frame 61, and a driving unit 63 including an electric motor 631 operable to rotate the drive wheel 62.

The linkage 7 includes a generally horizontal front link 71 and an inclined rear link 72. The front link 71 has a front end connected pivotally to the front caster frame 41 at a second pivot point (P2), and a rear end connected pivotally to an end of the drive wheel frame 61 at a third pivot point (P3). The drive wheel frame 61 extends rearwardly and downwardly from the third pivot point (P3). The first pivot point (P1) is disposed in front of and above the second pivot point (P2).

The rear link 72 extends forwardly and downwardly from the mainframe 3, and has a front end connected pivotally to the rear end of the front link 71 at the third pivot point (P3), and a rear end connected pivotally to the front connecting section 311 of the mainframe 3 at a fourth pivot point (P4).

The rear caster assembly 8 includes a rear caster frame 81 attached fixedly to a rear end of the rear connecting section 312 of the mainframe 3 at an upper end thereof, and a rear caster 82 disposed pivotally on a lower end of the rear caster frame 81.

When the wheelchair suspension moves on a horizontal surface, because the return spring 5 biases the front caster 42 to the predetermined position, a lower end of the front caster 42 can be aligned with lower ends of the drive wheel 62 and the rear caster 82.

Figure 7:
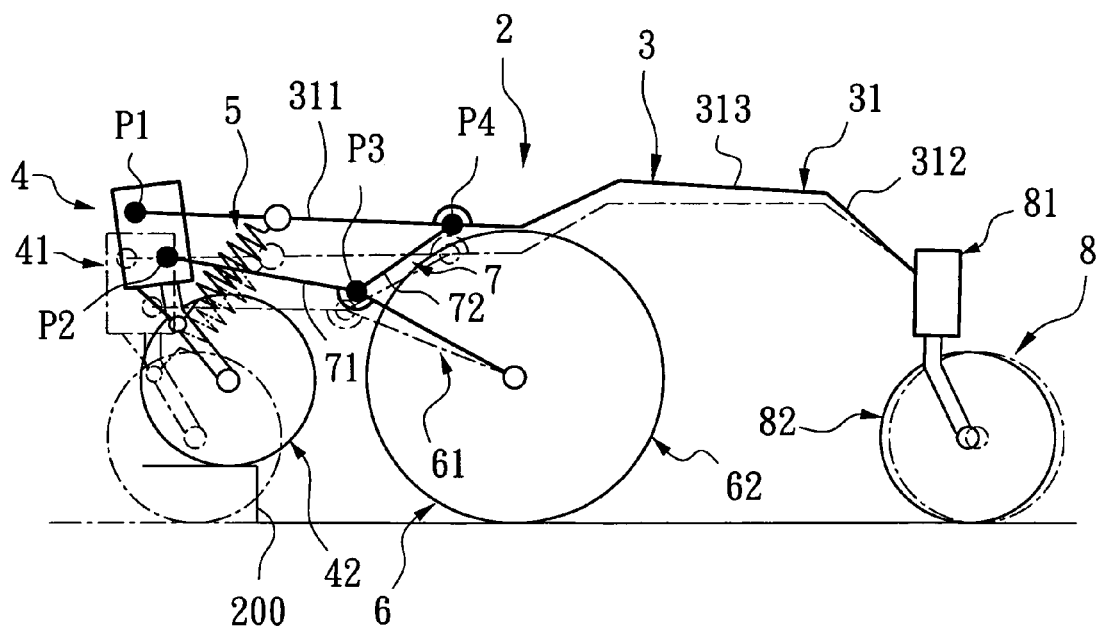
FIG. 7 is a schematic side view of the preferred embodiment when a front caster climbs over an obstacle.

Referring to FIG. 7, when the front caster 42 climbs over an obstacle 200 in the wheelchair's path, such as a stair, the return spring 5 is compressed. After the front caster 42 surmounts the obstacle 200, the return spring 5 returns to its original shape so as to bring the front caster 42 into contact with a top surface of the obstacle 200, thereby preventing the tipping of the electric wheelchair.

To test the wheelchair suspension, the following parameters are used: a radius of each of the front and rear casters 42, 82 of 75 mm, a distance between the axles of the front and rear casters 42, 83 of 668 mm, a radius of the drive wheel 62 of 130 mm, a person sitting on the electric wheelchair weighing 70 kilograms, and a total weight of the remaining portion of the electric wheelchair supported by the drive wheel 62 and the front and rear casters 42, 82 of 74 kilograms.

When the front casters 42 surmount different obstacles 200, corresponding inclination angle changes of the seat of the electric wheelchair are as outlined in the following chart:

|  | Obstacle Height (mm) | | | | | |
| --- | --- | --- | --- | --- | --- | --- |
|  | 10 | 20 | 30 | 40 | 50 | 60 |
| Angle Change (degrees) | 0.96 | 1.90 | 2.82 | 3.73 | 4.62 | 5.49 |

Figure 1:
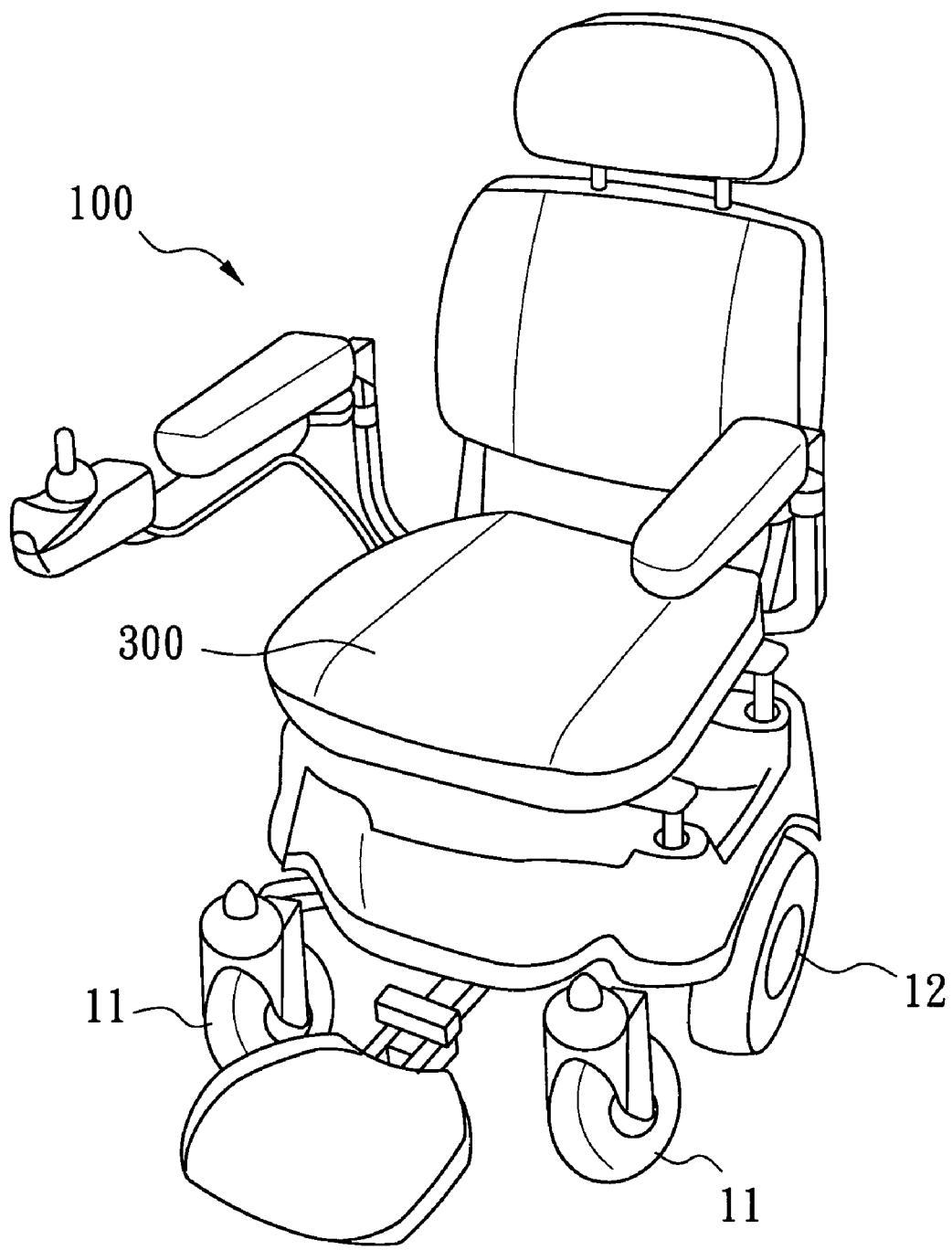
FIG. 1 is a perspective view of a conventional electric wheelchair.
Figure 2:
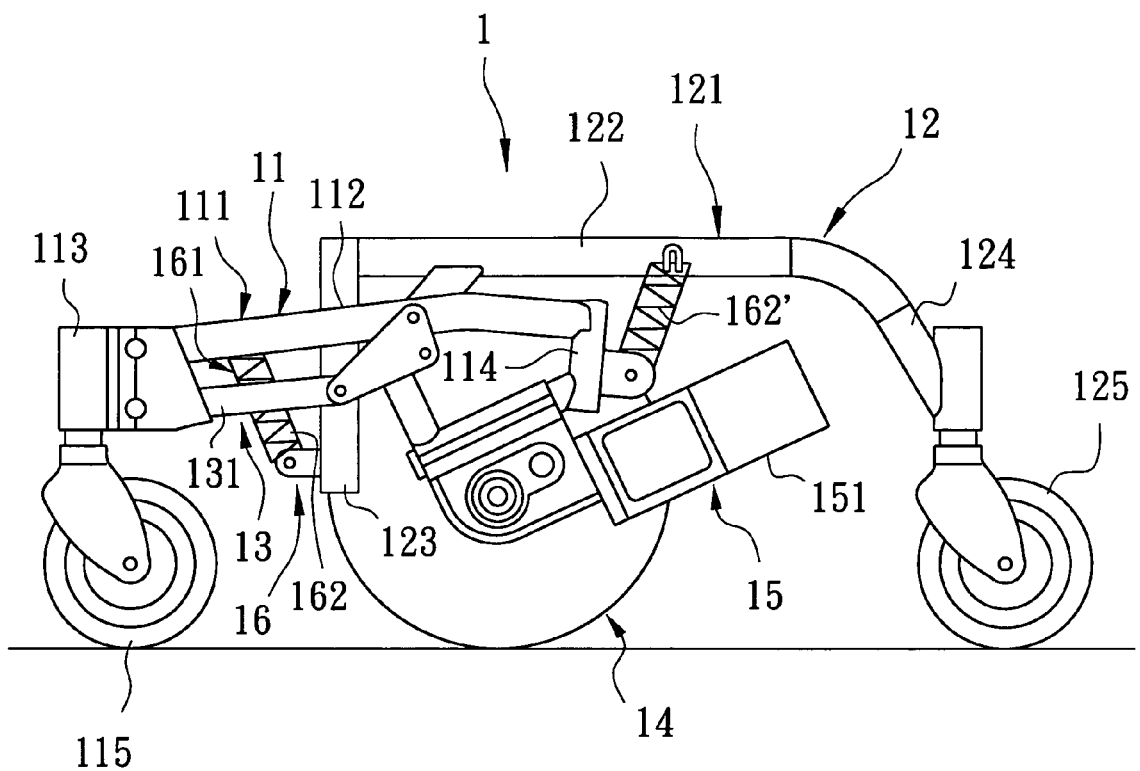
FIG. 2 is a side view of a side frame assembly of a suspension of the conventional electric wheelchair.
Figure 3:
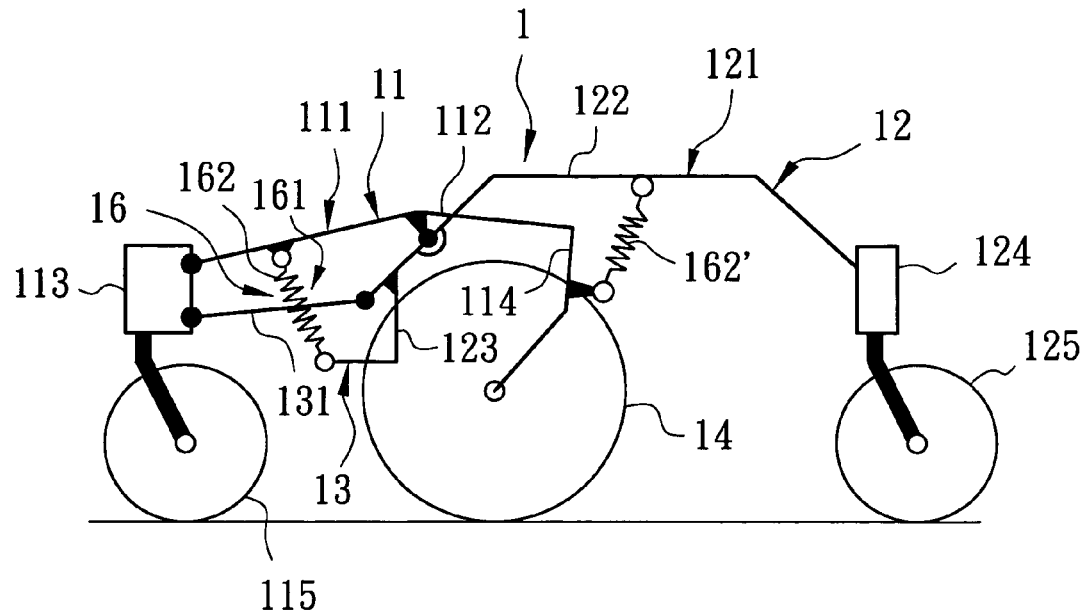
FIG. 3 is a schematic side view of the side frame assembly of the suspension of the conventional electric wheelchair, illustrating how the wheelchair moves on a horizontal surface.
Figure 4:
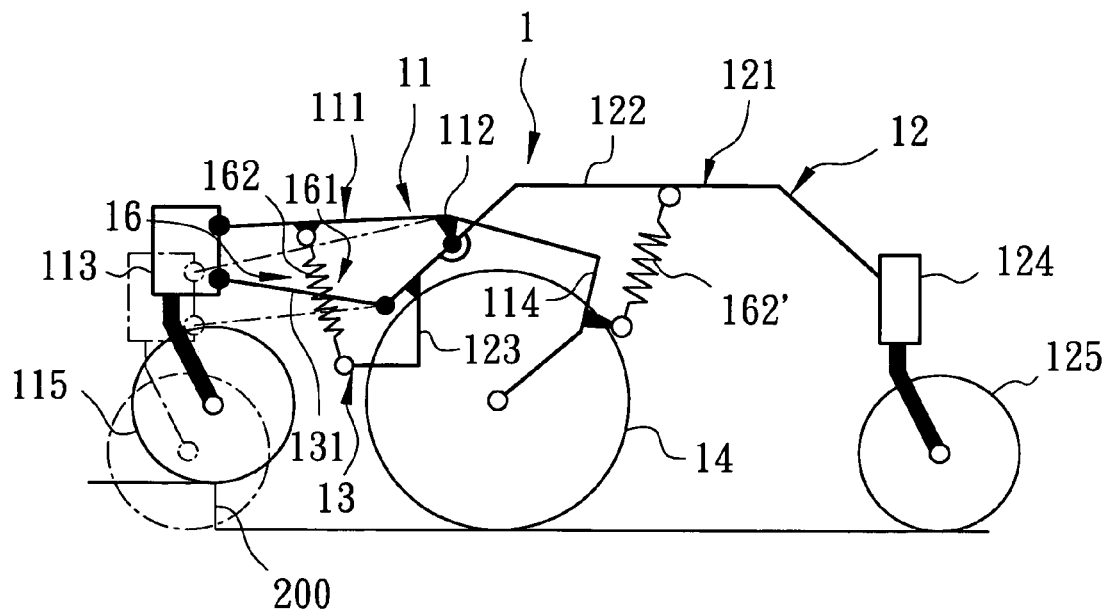
FIG. 4 is a schematic side view of the side frame assembly of the suspension of the conventional electric wheelchair, illustrating how a front caster climbs over an obstacle.

As indicated by the data in this chart, the angle changes of the seat of the electric wheelchair incorporating the suspension of this invention are smaller than those of the conventional wheelchair shown in FIG. 1, regardless of the height of the obstacle 200. As such, the anti-tip effect of the wheelchair suspension is increased.

In the case where the height of the obstacle 200 is 50 mm, when the front casters 42 contact the obstacle 200, the load ratios of the front casters 42, the rear casters 82 and the drive wheels 62 are respectively 27.9%, 11.9% and 60.2%; after the front casters 42 surmount the obstacle 200 and before the drive wheels 42 contact the obstacle 200, the load ratios of the front casters 42, the rear casters 82 and the drive wheels 62 are respectively 17.6%, 26.7% and 55.7%; after the front casters 42 surmount the obstacle 200 and when the drive wheels 62 contact the obstacle 200, the load ratios of the front casters 42, the rear casters 82 and the drive wheels 62 are respectively 22.3%, 34.3% and 43.4%; after the drive wheels 62 surmount the obstacle 200 and before the rear casters 82 contact the obstacle 200, the load ratios of the front casters 42, the rear casters 82 and the drive wheels 62 are respectively 25.9%, 36.9% and 37.2%; after the drive wheels 62 surmount the obstacle 200 and when the rear casters 82 contact the obstacle 200, the load ratios of the front casters 42, the rear casters 82 and the drive wheels 62 are respectively 23.6%, 50.0% and 26.4%; and after the rear casters 82 surmount the obstacle 200, the load ratios of the front casters 42, the rear casters 82 and the drive wheels 62 are respectively 23.8%, 48.2% and 28.0%. The load ratios of each of the front casters 42, the rear casters 82, and the drive wheels 62 are in all instances greater than 10%, thereby resulting in an increase in the anti-tip and supporting ability of the wheel or caster. This improves the safety and comfort of the electric wheelchair when encountering an obstacle.

Furthermore, use of the single spring 5 in the side frame assembly 2 results in a simple structure of the wheelchair, and therefore reduces the manufacturing costs of the wheelchair.

With this invention thus explained, it is apparent that numerous modifications and variations can be made without departing from the scope and spirit of this invention. It is therefore intended that this invention be limited only as indicated by the appended claims.

We claim:

1. A side frame assembly for a wheelchair suspension comprising:
   a mainframe;
   a front caster assembly including a front caster frame and a front caster, said front caster frame having two opposite ends connected respectively and pivotally to a front end of said mainframe and said front caster;
   a return spring disposed between said front caster frame and said mainframe so as to bias said front caster to a predetermined position relative to said mainframe;
   a drive wheel assembly disposed behind said front caster assembly and including a drive wheel frame, a drive wheel disposed pivotally on said drive wheel frame; and a driving unit operable to rotate said drive wheel;
   a linkage connected pivotally to said mainframe; said front caster frame and said drive wheel frame; and
   a rear caster assembly including a rear caster frame attached to a rear end of said mainframe, and rear caster disposed pivotally on said rear caster frame; wherein said front caster frame is connected pivotally to said mainframe at a first pivot point, said linkage including:
   a front link having a front end connected pivotally to said front caster frame at a second pivot point, and a rear connected pivotally to said front caster frame at a second pivot point, and a rear end connected pivotally to an end of said device wheel frame at a third pivot point; and
   an inclined rear link having a front end connected pivotally to said rear end of said front link at said third pivot point, and a rear end connected pivotally to said mainframe at a fourth pivot point.

2. The side frame assembly as claimed in claim 1, wherein said return spring is configured as a coiled compression spring that is inclined and that has a rear upper end fastened to said mainframe, and a front lower end fastened to said front caster frame.

3. The side frame assembly as claimed in claim 1, wherein said first pivot point is disposed in front of and above said second pivot point.

4. The side frame assembly as claimed in claim 1, wherein said front link is generally horizontal, said rear link extending forwardly and downwardly from said mainframe, said drive wheel frame extending rearwardly and downwardly from said third pivot point.

* * * * *